US007178255B1

(12) United States Patent
Roesel et al.

(10) Patent No.: US 7,178,255 B1
(45) Date of Patent: Feb. 20, 2007

(54) METHODS AND APPARATUS FOR MANUFACTURING COMPONENTS

(75) Inventors: Joseph C. Roesel, Cincinnati, OH (US); Todd Gary Heinrich, Cincinnati, OH (US); Mark E. Leeds, Mason, OH (US); Cary Kinder, Springboro, OH (US); Daniel Edward Jones, Hamilton, OH (US); Michael Joseph Martini, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/222,686

(22) Filed: Sep. 9, 2005

(51) Int. Cl.
*G01D 21/00* (2006.01)

(52) U.S. Cl. .......................................... 33/645; 33/549

(58) Field of Classification Search .................. 33/645, 33/533, 549, 530, 562
See application file for complete search history.

(56) References Cited

U.S. PATENT DOCUMENTS 5,762,115 A * 6/1998 Shouse ........................ 33/562
5,797,193 A * 8/1998 Amend et al. ................ 33/645
6,068,541 A * 5/2000 Dwyer ........................ 451/28
6,199,291 B1 * 3/2001 Ozee ........................... 33/645
6,334,258 B1 * 1/2002 Lee et al. ..................... 33/549
6,425,280 B1 * 7/2002 Ames et al. .................. 33/645
6,601,313 B2 * 8/2003 Shin et al. ..................... 33/645
6,842,995 B2 * 1/2005 Jones et al. ................... 33/645
7,086,171 B2 * 8/2006 Lawson ....................... 33/562
7,103,985 B1 * 9/2006 Phillips et al. ................ 33/562

* cited by examiner

*Primary Examiner*—Christopher W. Fulton
(74) *Attorney, Agent, or Firm*—William Scott Andes; Armstrong Teasdale LLP

(57) ABSTRACT

A method for aligning a first and a second component for manufacturing using an alignment member. The first component includes at least one first datum and the second component includes at least one second datum. The method includes fixedly securing the alignment member to a fixture in a first orientation relative to the fixture, coupling the first component to the fixture such that the at least one first datum is aligned with a corresponding datum locator of a first datum nest of the alignment member, removing the first component from the fixture, repositioning the alignment member relative to the fixture from the first orientation to a second orientation, fixedly securing the alignment member in the second orientation, and coupling the second component to the fixture such that the at least one second datum is aligned with a corresponding datum locator of a second datum nest of the alignment member.

20 Claims, 7 Drawing Sheets

METHODS AND APPARATUS FOR MANUFACTURING COMPONENTS

BACKGROUND OF THE INVENTION

This invention relates generally to manufacturing components, and more specifically to methods and apparatus for aligning components for manufacture.

Accurate manufacturing of gas turbine engine components may be a significant factor in determining both manufacturing timing and cost. Specifically, when the component is a gas turbine engine blade, accurate manufacturing of the blade may be a significant factors affecting an overall cost of fabrication of the gas turbine engine, as well as subsequent modifications, repairs, and inspections of the blade. For example, at least some known gas turbine engine blades include a dovetail that typically requires an accurate machining process to create the dovetail profile and under platform surfaces.

To align the dovetail for machining, the blade may be coupled to a fixture that includes at least one surface that locates a plurality of datums on the dovetail and/or other portions of the blade. Similar portions of different gas turbine blades may sometimes be machined on the same machine. However, generally, different engine blades have different datums due to a difference in a size and/or shape of the blades. Accordingly, different engine blades generally require different locating surfaces on the fixture to accurately align the blades for machining. As a result, the entire fixture, or alternatively an alignment member or a locating surface used with the fixture, may have to be replaced to accommodate different blades. However, replacing alignment members or the entire fixture may be time consuming, and thereby increase engine manufacturing cycle times and fabrication costs.

BRIEF DESCRIPTION OF THE INVENTION

In one aspect, a method is provided for aligning a first and a second component for manufacturing using an alignment member, wherein the first component includes at least one first datum and the second component includes at least one second datum. The method includes fixedly securing the alignment member to a fixture in a first orientation relative to the fixture, coupling the first component to the fixture such that the at least one first datum is aligned with a corresponding datum locator of a first datum nest of the alignment member, removing the first component from the fixture, repositioning the alignment member relative to the fixture from the first orientation to a second orientation relative to the fixture, fixedly securing the alignment member in the second orientation, and coupling the second component to the fixture such that the at least one second datum is aligned with a corresponding datum locator of a second datum nest of the alignment member.

In another aspect, an alignment member is provided for aligning a first component and a second component with a fixture to facilitate manufacturing the first and second components. The alignment member includes a first datum nest including at least one first datum locator configured to locate a corresponding datum of the first component when the alignment member is fixedly secured to the fixture in a first orientation relative to the fixture, and a second datum nest including at least one second datum locator configured to locate a corresponding datum of the second component when the alignment member is fixedly secured to the fixture in a second orientation relative to the fixture.

In even another aspect, an assembly for use in manufacturing a first component and a second component includes a fixture, and at least one alignment member for aligning the first and second components with the fixture. The alignment member includes a first datum nest including at least one first datum locator configured to locate a corresponding datum of the first component when the alignment member is fixedly secured to the fixture in a first orientation relative to the fixture, and a second datum nest including at least one second datum locator configured to locate a corresponding datum of the second component when the alignment member is fixedly secured to the fixture in a second orientation relative to the fixture.

DETAILED DESCRIPTION OF THE INVENTION

As used herein, the terms “manufacturing” and “manufacture” may include any process for shaping and/or evaluating a component, such as, but not limited to fabrication and/or inspection. As used herein the terms “machining,” “machine,” and “machined” may include any process used for shaping a component. For example, processes used for shaping a component may include, but are not limited to including, turning, planing, milling, grinding, finishing, polishing, and/or cutting. In addition, and for example, shaping processes may include, but are not limited to including, processes performed by a machine, a machine tool, and/or a human being. The above examples are intended as exemplary only, and thus are not intended to limit in any way the definition and/or meaning of the terms “machining,” “machine,” and “machined”.

As used herein, the terms “inspection” and “inspecting” may include any inspection process. For example, inspection processes may include measurement by a machine, measurement by humans, visual inspection by a machine, and/or visual inspection by a human. The above examples are intended as exemplary only, and thus are not intended to limit in any way the definition and/or meaning of the terms “inspection” and “inspecting”. In addition, as used herein the term “component” may include any object that has been or may be manufactured.

Figure 1:
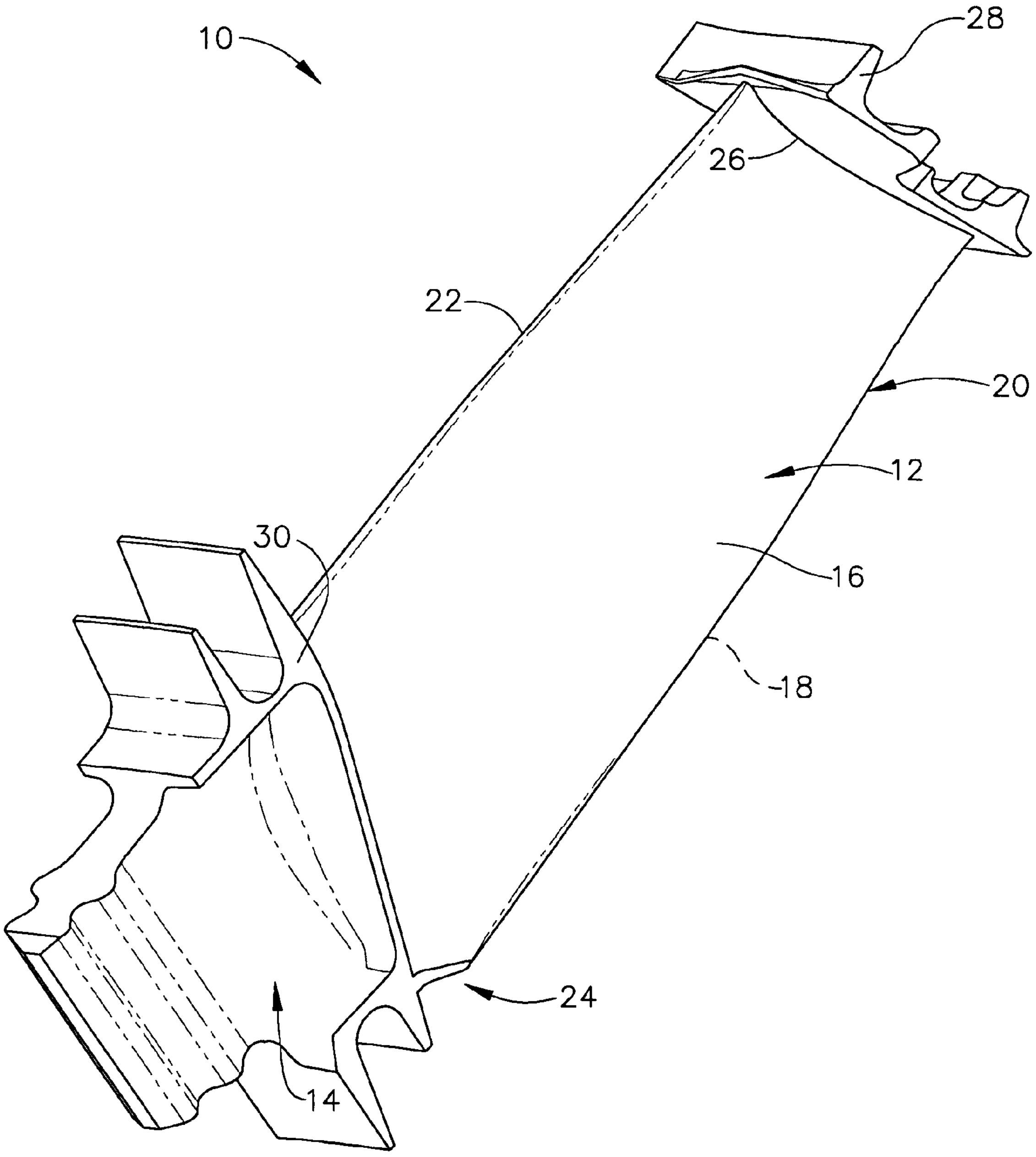
FIG. 1 is a perspective view of an exemplary gas turbine engine blade.

FIG. 1 is a perspective view of an exemplary engine blade 10 that may be used with a gas turbine engine (not shown). In some embodiments, a plurality of turbine blades 10 form a high-pressure turbine rotor blade stage (not shown) within the gas turbine engine. Each blade 10 includes an airfoil 12 and an integral dovetail 14 that is used for mounting airfoil 12 to a rotor disk (not shown) in a known manner. Alternatively, blades 10 may extend radially outwardly from a disk (not shown), such that a plurality of blades 10 form a blisk (not shown).

Each airfoil 12 includes a first contoured sidewall 16 and a second contoured sidewall 18. First sidewall 16 is convex and defines a suction side of airfoil 12, and second sidewall 18 is concave and defines a pressure side of airfoil 12. Sidewalls 16 and 18 are joined at a leading edge 20 and at an axially-spaced trailing edge 22 of airfoil 12. More specifically, airfoil trailing edge 22 is spaced chordwise and downstream from airfoil leading edge 20. First and second sidewalls 16 and 18, respectively, extend longitudinally or radially outward in span from a blade root 24 positioned adjacent dovetail 14, to an airfoil tip 26. In the exemplary embodiment, airfoil tip 26 includes a tip shroud 28 extending radially outward therefrom in a direction away from airfoil 12. A dovetail platform 30 is positioned at blade root 24 and extends radially outward from first and second sidewalls 16 and 18, respectively.

Figure 2:
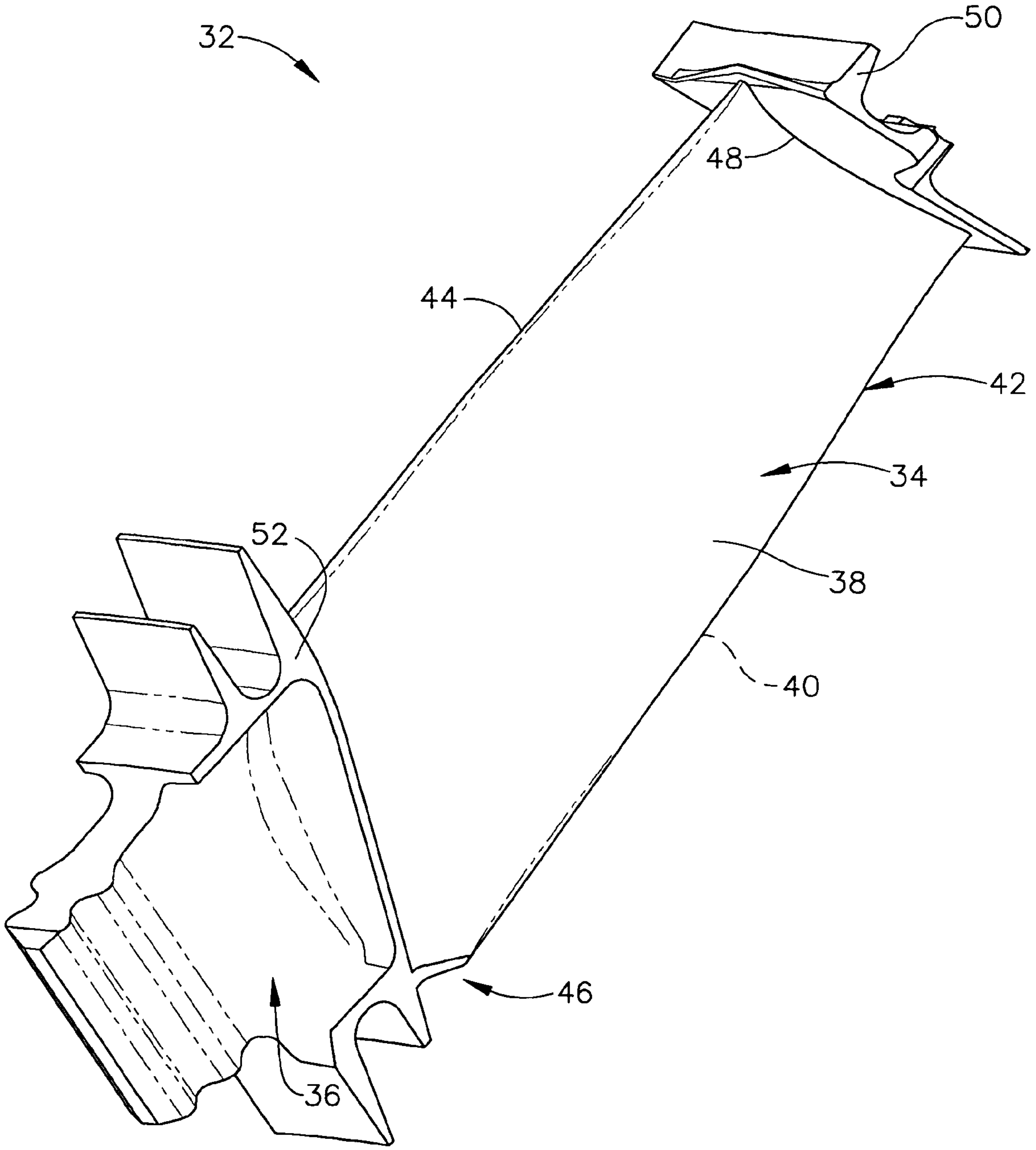
FIG. 2 is a perspective view of another exemplary gas turbine engine blade.

FIG. 2 is a perspective view of another exemplary engine blade 32 that may be used with a gas turbine engine (not shown). In some embodiments, a plurality of turbine blades 32 form a high-pressure turbine rotor blade stage (not shown) within the gas turbine engine. Each blade 32 includes an airfoil 34 and an integral dovetail 36 that is used for mounting airfoil 34 to a rotor disk (not shown) in a known manner. Alternatively, blades 32 may extend radially outwardly from a disk (not shown), such that a plurality of blades 32 form a blisk (not shown).

Each airfoil 34 includes a first contoured sidewall 38 and a second contoured sidewall 40. First sidewall 38 is convex and defines a suction side of airfoil 34, and second sidewall 40 is concave and defines a pressure side of airfoil 34. Sidewalls 38 and 40 are joined at a leading edge 42 and at an axially-spaced trailing edge 44 of airfoil 34. More specifically, airfoil trailing edge 44 is spaced chordwise and downstream from airfoil leading edge 42. First and second sidewalls 38 and 40, respectively, extend longitudinally or radially outward in span from a blade root 46 positioned adjacent dovetail 36, to an airfoil tip 48. In the exemplary embodiment, airfoil tip 48 includes a tip shroud 50 extending radially outward therefrom in a direction away from airfoil 34. A dovetail platform 52 is positioned at blade root 46 and extends radially outward from first and second sidewalls 38 and 40, respectively.

Figure 3:
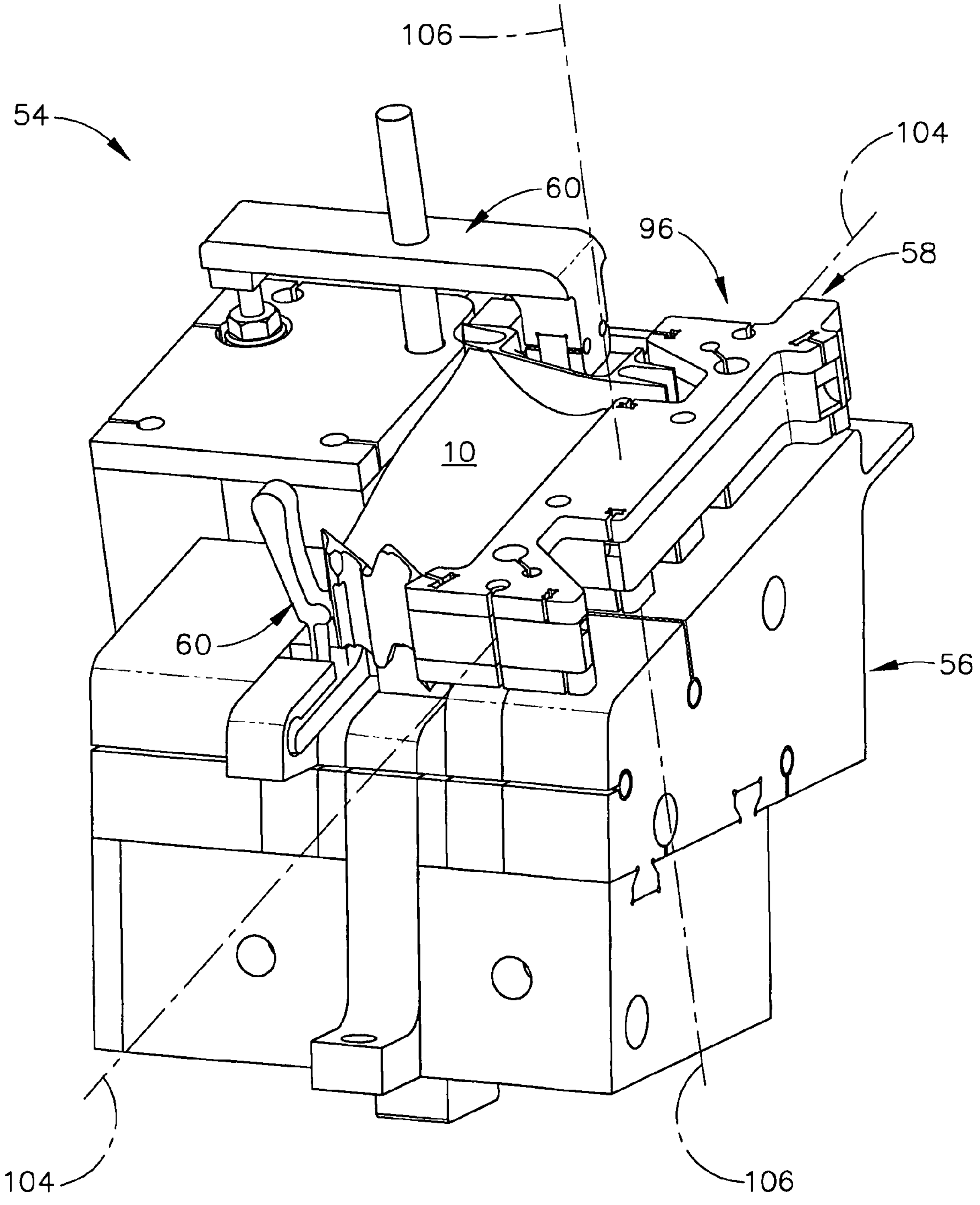
FIG. 3 is a perspective view of an exemplary embodiment of a fixture assembly for use in manufacturing a component, such as the gas turbine engine blades shown in FIGS. 1 and 2.
Figure 4:
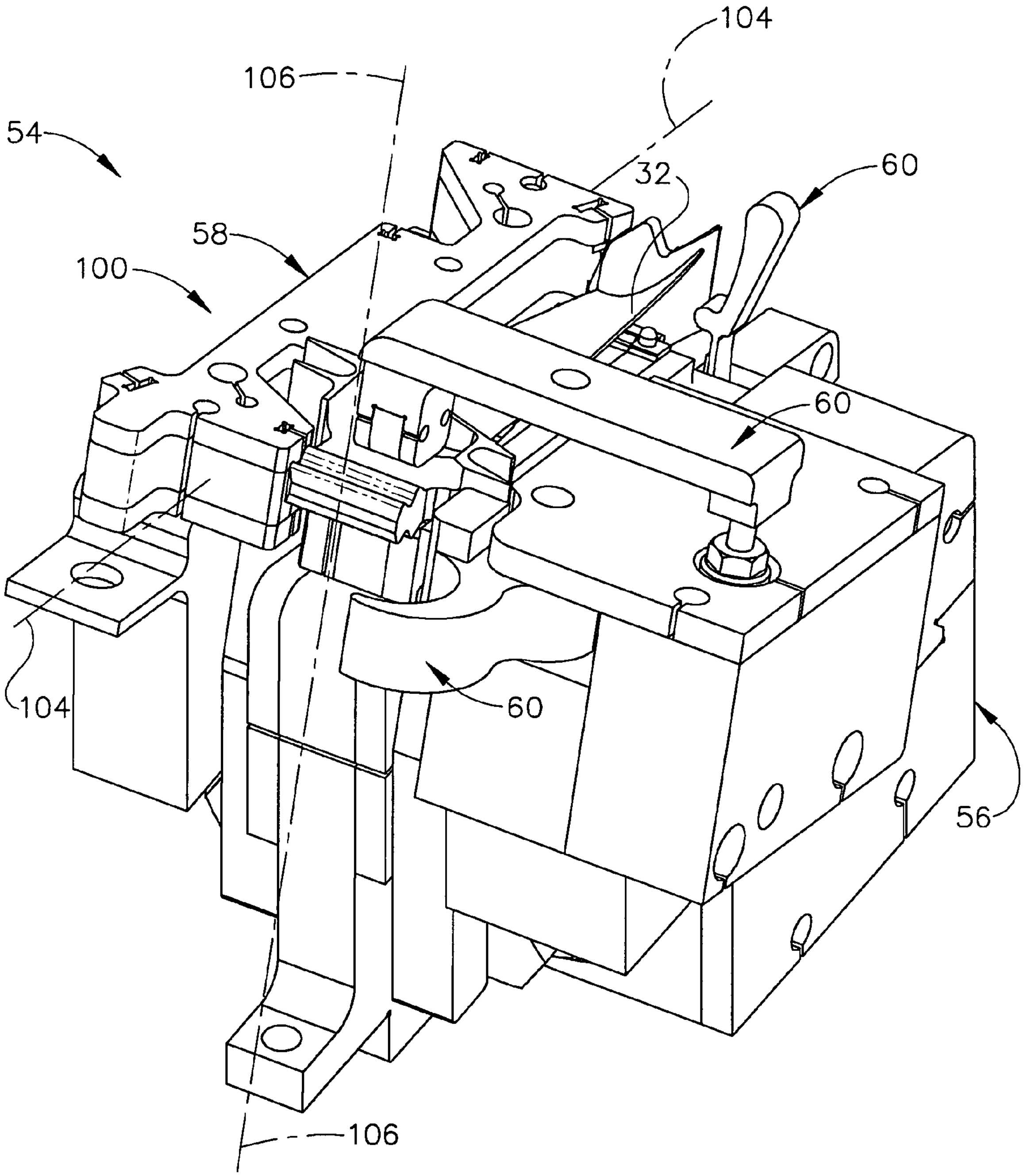
FIG. 4 is a perspective view of the exemplary fixture assembly shown in FIG. 3.

FIGS. 3 and 4 are perspective views of an exemplary embodiment of a fixture assembly 54 for use in manufacturing a component. Although fixture assembly 54 may be used to manufacture any component, for example components of any operable shape, size, configuration, and/or material(s), in the exemplary embodiment fixture assembly 54 is used in manufacturing engine blades 10 (shown FIG. 1) and 32 (shown in FIG. 2). Of course, it should be appreciated that the specific size, shape, and/or configuration of fixture assembly 54 described and/or illustrated herein is exemplary only. Accordingly, the specific size, shape, and/or configuration of fixture assembly 54 generally, as well as portions thereof, may be selected to accommodate other components than engine blades 10 and 32.

Fixture assembly 54 includes a fixture 56 and at least one alignment member 58 for aligning blades 10 and 32 relative to fixture 56. Blades 10 and/or 32 are separately coupled to fixture 56 for separate manufacture thereof. For example, fixture assembly 54 may be positioned adjacent a machining tool (not shown) and/or an inspection tool (not shown) for machining and/or inspecting various surfaces of blades 10 and/or 32. Blades 10 and 32 are coupled to fixture 56 in any suitable manner and using any suitable means. In the exemplary embodiment, blades 10 and 32 are coupled to fixture 56 using a plurality of clamping mechanisms 60. In some embodiments, at least one clamping mechanism 60 includes a biasing mechanism (not shown), such as, but not limited to, a spring, to facilitate coupling blades 10 and 32 to fixture 56. Alignment member 58 is secured to fixture 56 in any suitable manner and using any suitable means, such as, but not limited to, threaded fasteners. Generally, alignment member 58 aligns blades 10 and 32 with fixture 56 such that blades 10 and 32 are aligned with respect to a manufacturing tool and/or an inspection tool. FIG. 3 illustrates blade 10 coupled to, and aligned with, fixture 56. FIG. 4 illustrates blade 32 coupled to, and aligned with, fixture 56.

Figure 5:
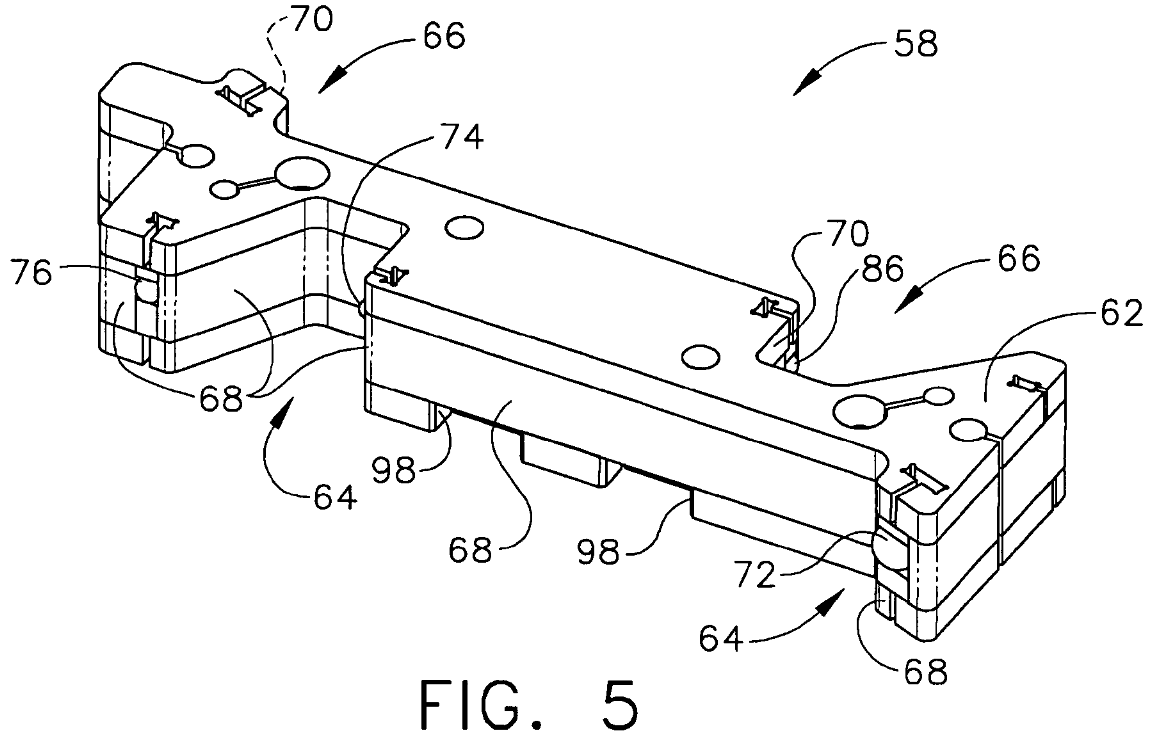
FIG. 5 is a perspective view of an exemplary embodiment of an alignment member for use with a fixture, such as the fixture shown in FIGS. 3 and 4.
Figure 6:
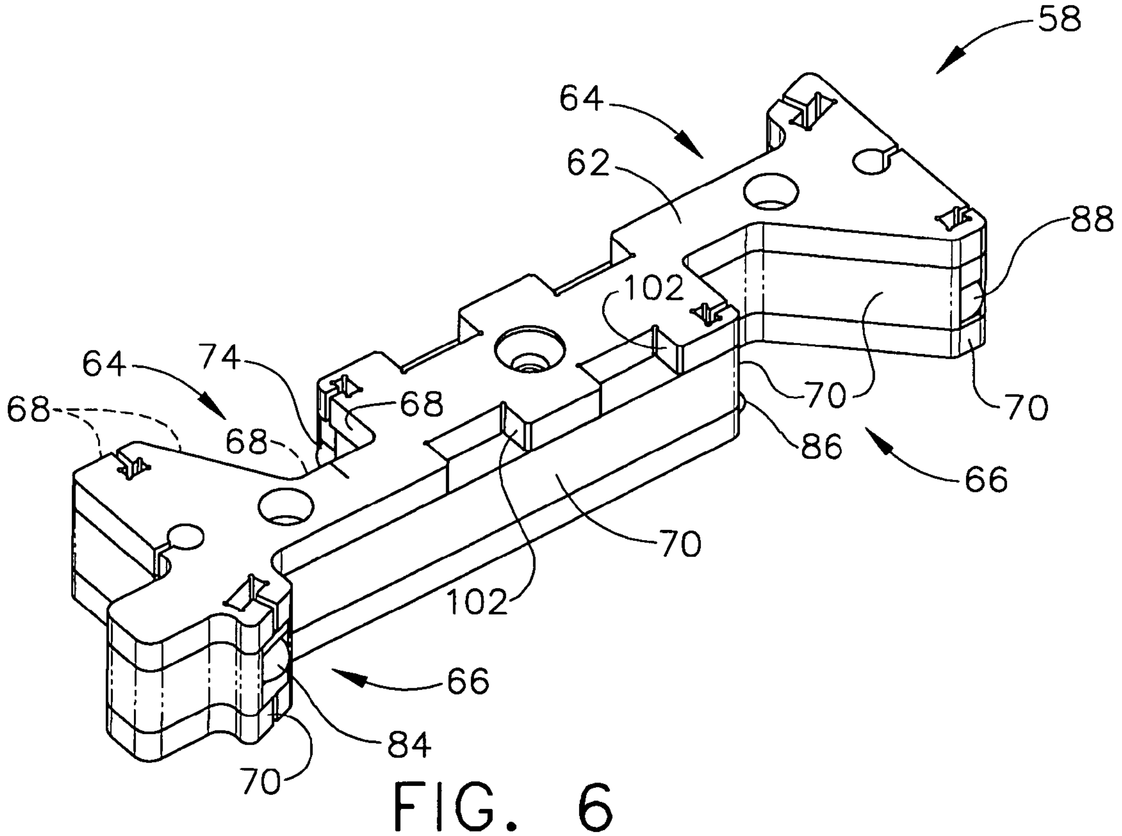
FIG. 6 is a perspective view of the exemplary alignment member shown in FIG. 5.
Figure 7:
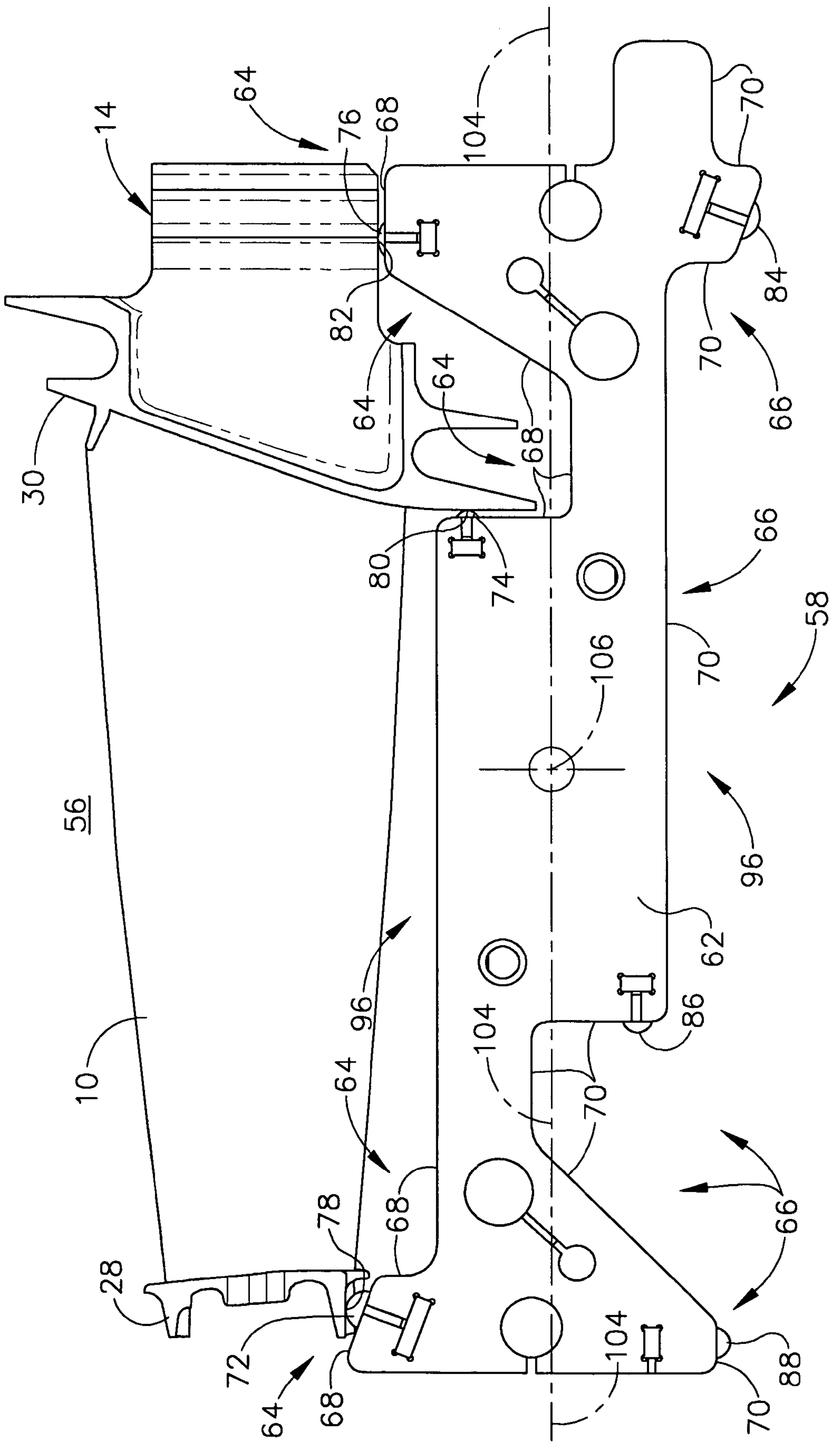
FIG. 7 is a top plan view of the exemplary alignment member shown in FIGS. 5 and 6 in a first orientation relative to the fixture shown in FIGS. 3 and 4.
Figure 8:
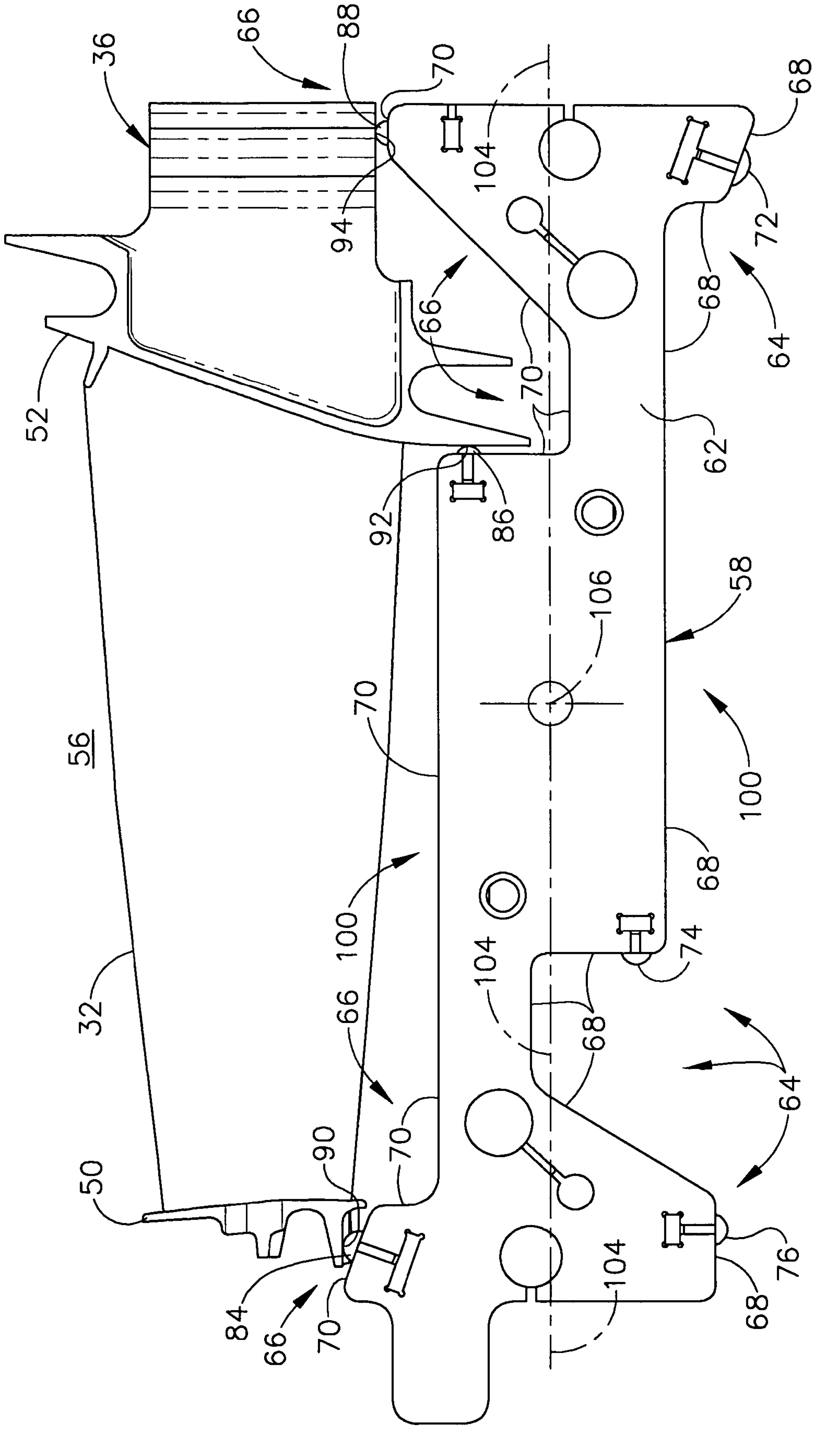
FIG. 8 is a top plan view of the exemplary alignment member shown in FIGS. 5 and 6 in a second orientation relative to the fixture shown in FIGS. 3 and 4.

FIGS. 5 and 6 are perspective views of an exemplary embodiment of alignment member 58. FIGS. 7 and 8 are top plan views of alignment member 58. Alignment member 58 includes a body 62 having a datum nest 64 for aligning blade 10, and a datum nest 66 for aligning blade 32. Datum nests 64 and 66 may each be located anywhere on alignment member 58 and may include any arrangement, configuration, size, and/or shape that facilitates aligning blades 10 and 32, respectively. Moreover, datum nests 64 and 66 may be located anywhere on alignment member body 62 relative to each other. Although only two datum nests 64 and 66 are illustrated, alignment member 58 may include any number of datum nests for aligning any number of different components with fixture 56. In the exemplary embodiment, alignment member body 62 includes a surface 68 that includes datum nest 64, and an opposing surface 70 that includes datum nest 66.

Datum nest 64 includes a plurality of datum locators 72, 74, and 76 on datum nest surface 68 for locating a plurality of datums 78, 80, and 82, respectively, on blade 10. Although three datum locators 72, 74, and 76 are illustrated, datum nest 64 may include any number of datum locators for locating any number of datums on blade 10. Moreover, datums 78, 80, and 82 may be located anywhere on blade 10. In the exemplary embodiment, datum 78 is located on blade tip shroud 28, datum 80 is located on blade dovetail platform 30, and datum 82 is located on blade root 14.

Datum nest 66 includes a plurality of datum locators 84, 86, and 88 on datum nest surface 70 for locating a plurality of datums 90, 92, and 94, respectively, on blade 32. Although three datum locators 84, 86, and 88 are illustrated, datum nest 66 may include any number of datum locators for locating any number of datums on blade 32. Moreover, datums 90, 92, and 94 may be located anywhere on blade 32. In the exemplary embodiment, datum 90 is located on blade tip shroud 50, datum 92 is located on blade dovetail platform 52, and datum 94 is located on blade root 36.

To manufacture different components, such as blades 10 and 32, an orientation of alignment member 58 can be changed to accommodate the particular component being manufactured. More specifically, and as shown in FIGS. 3 and 7, to manufacture blades 10 and 32 using fixture 56, alignment member 58 is fixedly secured to fixture 56 in an orientation 96 relative to fixture 56 that facilitates manufacturing blade 10. (Alternatively, blade 32 is manufactured before blade 10.) To facilitate positioning alignment member 58 in orientation 96, in the exemplary embodiment alignment member 58 includes at least one slot 98 (shown in FIG. 5) defined therein for receiving an extension (not shown) extending from fixture 56. The extension is sized for insertion in slot 98. Although two slots 98 are illustrated, alignment member 58 may include any number of slots 98 for receiving any number of extensions. Moreover, in some embodiments, fixture 56 includes at least one slot (not shown) defined therein for receiving an extension (not shown) extending outwardly from alignment member 58 to facilitate positioning alignment member 58 in orientation 96. The extension is sized for insertion in the slot. Moreover, fixture 56 may include any number of slots for receiving any number of extensions. Once alignment member 58 is fixedly secured in orientation 96, blade 10 is coupled to fixture 56 such that datum 78 is aligned with datum locator 72, datum 80 is aligned with datum locator 74, and datum 82 is aligned with datum locator 76. A manufacturing process can then be performed on blade 10.

To manufacture blade 32, blade 10 is removed from fixture 56 and alignment member 58 is repositioned relative to fixture 56 from orientation 96 to an orientation 100, shown in FIGS. 4 and 8, relative to fixture 56 that facilitates manufacturing blade 32. Alignment member 58 is then fixedly secured to fixture 56 in orientation 100. Alignment member 58 can be repositioned using any movement, for example in any direction and by any amount, to be repositioned between orientations 96 and 100. Of course, such movement will depend upon the location of datum nests 64 and 66 relative to each other on alignment member 58. In the exemplary embodiment, alignment member 58 is rotated about 180° about a central longitudinal axis 104 or a central axis 106 of alignment member 58 to move between orientations 96 and 100.

To facilitate positioning alignment member 58 in orientation 100, in the exemplary embodiment alignment member 58 includes at least one slot 102 (shown in FIG. 5) defined therein for receiving an extension (not shown) extending from fixture 56. The extension is sized for insertion in slot 102. Although two slots 102 are illustrated, alignment member 58 may include any number of slots 102 for receiving any number of extensions. Moreover, in some embodiments, fixture 56 includes at least one slot (not shown) defined therein for receiving an extension (not shown) extending outwardly from alignment member 58 to facilitate positioning alignment member 58 in orientation 100. The extension is sized for insertion in the slot. Moreover, fixture 56 may include any number of slots for receiving any number of extensions. Once alignment member 58 is fixedly secured in orientation 100, blade 32 is coupled to fixture 56 such that datum 90 is aligned with datum locator 84, datum 92 is aligned with datum locator 86, and datum 94 is aligned with datum locator 88. A manufacturing process can then performed on blade 32.

As described above, because alignment member 58 includes datum nests 64 and 66, alignment member 58 can be used to align both blades 10 and 32 by moving alignment member 58 between orientations 96 and 100. Alignment member 58 therefore does not need to be replaced with another alignment member and/or fixture when switching between manufacturing processes performed on blades 10 and 32. Accordingly, alignment member 58 may facilitate reducing a cycle time of manufacturing blades 10 and 32, thereby possibly reducing an overall cost of manufacturing blades 10 and 32. Moreover, slots 98 and 102 of alignment member 58 may facilitate accurate positioning of alignment member 58 in orientations 96 and 100, respectively, in less time, thereby possibly increasing repeatability and further reducing a cycle time of manufacture of blades 10 and 32. Furthermore, because a separate alignment member and/or fixture may not be required to align blades 10 and 32, alignment member 58 may increase an amount of available storage and/or work space adjacent a machine that includes fixture assembly 54.

Although the assemblies, members, and methods described and/or illustrated herein are described and/or illustrated with respect to gas turbine engine components, and more specifically a rotor blade for a gas turbine engine, practice of the assemblies, members, and methods described and/or illustrated herein is not limited to engine blades, nor gas turbine engine components generally. Rather, the assemblies, members, and methods described and/or illustrated herein are applicable to any component and/or any manufacturing process.

Exemplary embodiments of assemblies, members, and methods are described and/or illustrated herein in detail. The assemblies, members, and methods are not limited to the specific embodiments described herein, but rather, components of each member and components of each assembly, as well as steps of each method, may be utilized independently and separately from other components and steps described herein. Each component, and each method step, can also be used in combination with other components and/or method steps.

When introducing elements/components/etc. of the assemblies, members, and methods described and/or illustrated herein, the articles "a", "an", "the" and "said" are intended to mean that there are one or more of the element(s)/component(s)/etc. The terms "comprising", "including" and "having" are intended to be inclusive and mean that there may be additional element(s)/component(s)/etc. other than the listed element(s)/component(s)/etc.

While the invention has been described in terms of various specific embodiments, those skilled in the art will recognize that the invention can be practiced with modification within the spirit and scope of the claims.

What is claimed is:

1. A method for aligning a first and a second component for manufacturing using an alignment member, wherein the first component includes at least one first datum and the second component includes at least one second datum, said method comprising:

fixedly securing the alignment member to a fixture in a first orientation relative to the fixture;

coupling the first component to the fixture such that the at least one first datum is aligned with a corresponding datum locator of a first datum nest of the alignment member;

removing the first component from the fixture;

repositioning the alignment member relative to the fixture from the first orientation to a second orientation relative to the fixture;

fixedly securing the alignment member in the second orientation; and coupling the second component to the fixture such that the at least one second datum is each aligned with a corresponding datum locator of a second datum nest of the alignment member.

2. A method in accordance with claim 1 further comprising:

machining the first component when the first component is coupled to the fixture; and machining the second component when the second component is coupled to the fixture.

3. A method in accordance with claim 1 wherein repositioning the alignment member relative to the fixture from the first orientation to a second orientation comprises rotating the alignment member about 180° about an axis of the alignment member.

4. A method in accordance with claim 1 wherein repositioning the alignment member relative to the fixture from the first orientation to a second orientation comprises inserting at least one extension of the fixture within a corresponding slot defined within the alignment member.

5. A method in accordance with claim 1 wherein repositioning the alignment member relative to the fixture from the first orientation to a second orientation comprises inserting at least one extension of the alignment member within a corresponding slot defined within the fixture.

6. A method in accordance with claim 1 wherein coupling the first component to the fixture comprises coupling a gas turbine engine blade to the fixture.

7. A method in accordance with claim 1 wherein coupling the second component to the fixture comprises coupling a gas turbine engine blade to the fixture.

8. An alignment member for aligning a first component and a second component with a fixture to facilitate manufacturing the first and second components, said alignment member comprising:

a first datum nest comprising at least one first datum locator configured to locate a corresponding datum of the first component when said alignment member is fixedly secured to the fixture in a first orientation relative to the fixture; and a second datum nest comprising at least one second datum locator configured to locate a corresponding datum of the second component when said alignment member is fixedly secured to the fixture in a second orientation relative to the fixture.

9. An alignment member in accordance with claim 8 further comprising:

a first surface comprising said first datum nest; and a second surface comprising said second datum nest.

10. An alignment member in accordance with claim 9 wherein said first surface is disposed opposite said second surface.

11. An alignment member in accordance with claim 8 further comprising at least one slot for receiving an extension of the fixture, said at least one slot facilitates orienting said alignment member relative to the fixture.

12. An alignment member in accordance with claim 8 further comprising at least one extension sized for insertion in a slot defined in the fixture, said at least one extension facilitates orienting said alignment member relative to the fixture.

13. An alignment member in accordance with claim 8 wherein at least one of said at least one first datum locator and said at least one second datum locator is configured to locate a corresponding datum of a gas turbine engine blade.

14. An alignment member in accordance with claim 8 wherein at least one of said at least one first datum locator and said at least one second datum locator is configured to locate a corresponding datum of one of a tip shroud, a dovetail platform, and a root of a gas turbine engine blade.

15. An assembly for use in manufacturing a first component and a second component, said fixture comprising:

a fixture; and at least one alignment member for aligning the first and second components with said fixture, said alignment member comprising:

a first datum nest comprising at least one first datum locator configured to locate a corresponding datum of the first component when said alignment member is fixedly secured to said fixture in a first orientation relative to said fixture; and a second datum nest comprising at least one second datum locator configured to locate a corresponding datum of the second component when said alignment member is fixedly secured to said fixture in a second orientation relative to said fixture.

16. An assembly in accordance with claim 15 wherein said alignment member further comprises:

a first surface comprising said first datum nest; and a second surface comprising said second datum nest.

17. An assembly in accordance with claim 15 wherein said alignment member first surface is disposed opposite said alignment member second surface.

18. An assembly in accordance with claim 15 wherein said alignment member further comprises at least one slot, said fixture comprising at least one extension configured to be inserted within said slot to facilitate orienting said alignment member relative to said fixture.

19. An assembly in accordance with claim 15 wherein said fixture comprises at least one slot, said alignment member further comprising at least one extension configured to be inserted within said slot to facilitate orienting said alignment member relative to said fixture.

20. An assembly in accordance with claim 15 wherein at least one of said at least one first datum locator and said at least one second datum locator is configured to locate a corresponding datum of one of a tip shroud, a dovetail platform, and a root of a gas turbine engine blade.

* * * * *